Sept. 2, 1924.

R. H. TRAPNELL

FURROW MAKING MACHINE

Filed May 25, 1921

WITNESSES

INVENTOR
ROBERT H. TRAPNELL

BY
ATTORNEYS

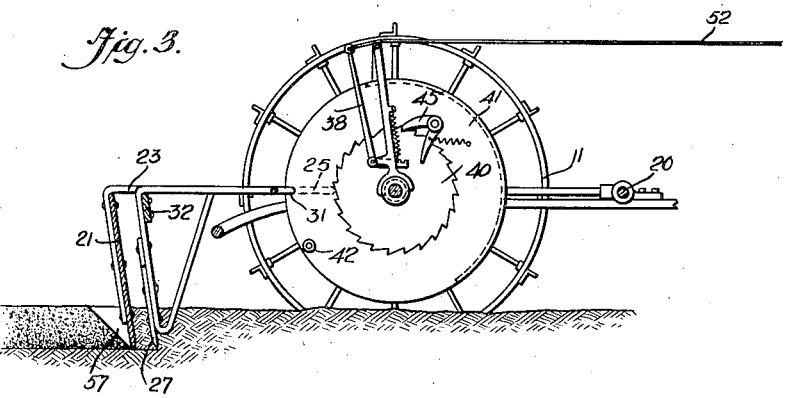
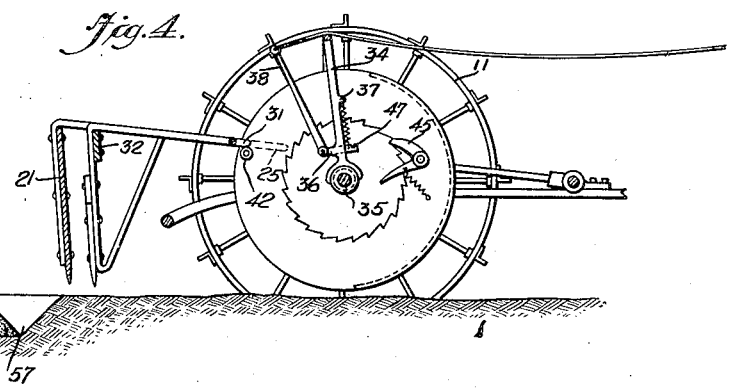
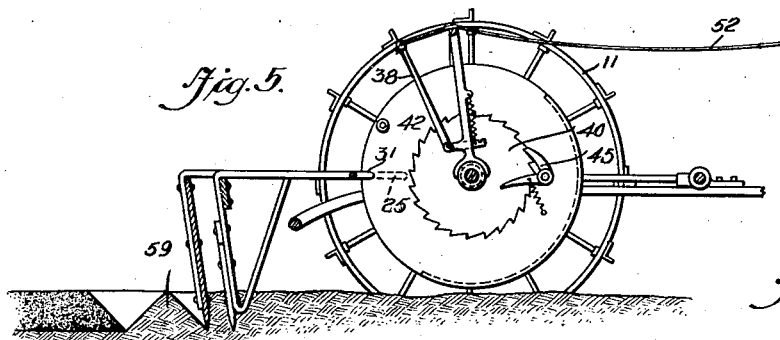
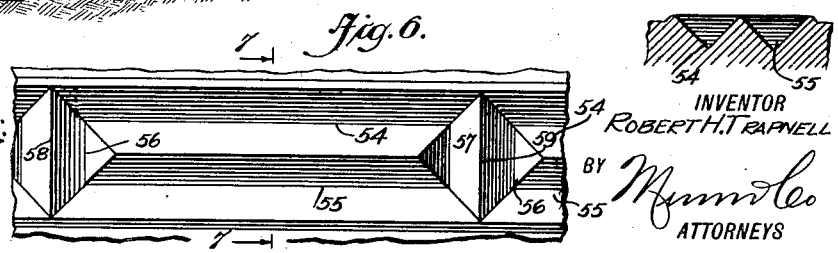

Patented Sept. 2, 1924.

1,507,218

UNITED STATES PATENT OFFICE.

ROBERT H. TRAPNELL, OF COVINA, CALIFORNIA.

FURROW-MAKING MACHINE.

Application filed May 25, 1921. Serial No. 472,343.

*To all whom it may concern:*

Be it known that I, ROBERT H. TRAPNELL, a citizen of Great Britain, and a resident of Covina, in the county of Los Angeles and State of California, have invented a new and Improved Furrow-Making Machine, of which the following is a full, clear, and exact description.

This invention relates to a furrow making and connecting machine for use in the cultivation of land.

Prior to this invention, in the cultivation of irrigated land, the connections between the furrows and checks across them to retain the water equally distributed were sometimes made by hand. This required a great amount of time and labor and greatly increased the cost of production.

The object of this invention is to produce a furrow making machine which is provided with apparatus for making connections between the furrows and constructing checks across them. This object is accomplished by providing, in conjunction with the furrow making machine, an intermittent checking scraper which may be operated at will to make a connection between the furrows and build a check across them.

The invention will be more clearly understood by reference to the following detailed description and accompanying drawings.

Figure 3 is a vertical cross section showing the scrapers and intermittent checking scraper in an active position;

Figure 4 is a vertical cross section showing the scrapers and intermittent checking scraper raised to an inactive position;

Figure 5 is a vertical cross section showing the scrapers and intermittent checking scraper digging into the ground after the construction of a check;

Figure 6 is a plan view showing the furrows, connections and checks; and

Figure 7 is a cross section along the line 7—7 of Figure 6.

Figure 1:
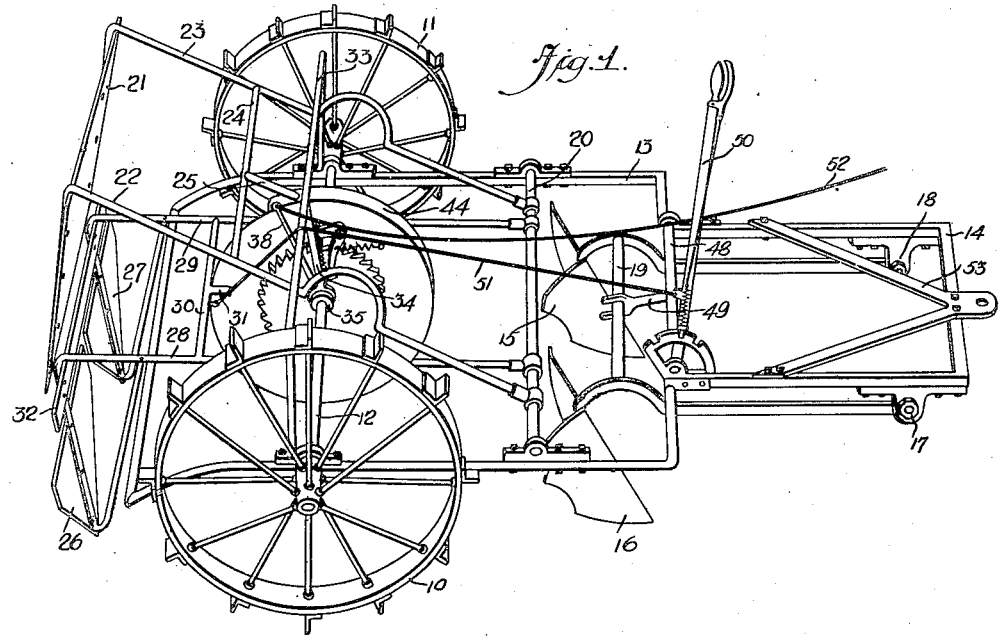
Figure 1 is a perspective view of the machine.

Referring to the above mentioned figures, cleated wheels 10 and 11 carry an axle 12 on which is mounted a frame 13. The extension 14 of the frame 13 has two plows 15 and 16 connected thereto at 17 and 18. The plows are spaced apart by a spacing member 19. Mounted on the frame 13 is a shaft 20 to which an intermittent checking scraper 21 is connected by means of members 22 and 23. These members are spaced by means of a spacing member 24 which carries a projection 25. The members 22 and 23 have curved offsets therein which allow them to fit over the axle 12 when the intermittent checking scraper 21 has dug into the earth. Scrapers 26 and 27 are connected to the shaft 20 by members 28 and 29 and have a spacing member 30 between them. A projection 31 which is integral with the member 30 is provided. A bar 32 is fixed to the connecting members 28 and 29 and is of sufficient length to engage the members 22 and 23 when the scrapers are raised. An arch member 33 is mounted on the frame 13 and may serve to limit the upward movement of members 22 and 23. An arm 34 which is integral with the arch member 33 engages with a bearing member 35 which is rotatably mounted on the axle 12. The arm 34 has two projections 36 and 37, and an L-shaped lever 38 is pivoted on projection 36. A spring 39 is connected to projection 37 and the lower portion of the L-shaped lever 38. A ratchet wheel 40 is fixed to the axle 12, and a disk 41 is loosely mounted on the axle. The disk 41 is provided with a pin 42 and a flange 44 which extends at right angles to the plane of the disk. The pin 42 has a roller 43 loosely mounted on it. A spring-controlled pawl 45 is pivoted to the disk 41 and under normal conditions engages in grooves 47 in the lower portion of the lever 38. A bar 48 rotatively mounted on the front portion of the extension 14 of the frame 13 is provided with a Y-shaped arm 49 which engages with the spacing member 19. A lever 50 is fixed to the bar 48 and serves as a means to rotate it. A chain or cable 51 is provided to connect the lever 50 to the spacing member 30. A line 52 is the means supplied for the operator to trip the lever 38. A Y-shaped member 53 is fixed to the extension 14 and serves as a means for connecting the machine to a traction engine or any other means for drawing. Referring to Figure 6, two furrows 54 and 55 are shown and connections 56 and 57 which join them. 58 and 59 are checks constructed across the furrows.

Figure 2:
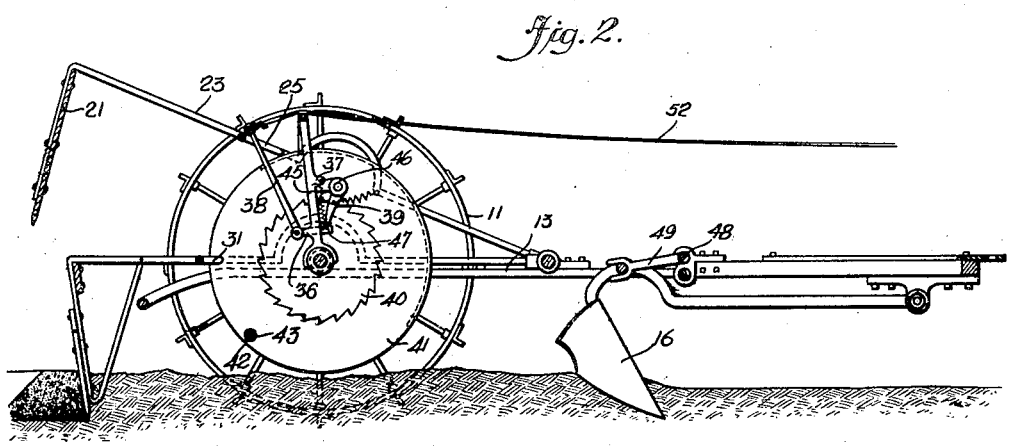
Figure 2 is an elevation of a vertical cross section.

The operation of the device is as follows: The lever 50 is rotated backward, rotating the bar 48 and thus lowering the plows 15 and 16 and at the same time releasing the tension on cable 51 and lowering the scrapers 26 and 27. As the machine is drawn forward the plows and scrapers dig into the ground, as shown in Figure 2, and furrows are made. When the operator has progressed a certain distance and he considers that the furrows should be connected together and a check built across them he pulls line 52 and trips lever 38 thus releasing pawl 45 which is rotated and engages with ratchet wheel 40. The disk 41 to which pawl 45 is pivoted rotates with ratchet wheel 40, and the projection 25 which holds the intermittent checking scraper 21 in an inactive position slides off flange 44. This allows the intermittent checking scraper to dig into the ground, as shown in Figure 3. As the disk 41 rotates, the roller 43 comes into engagement with projection 31 and raises the connecting members 28 and 29 to which the scrapers 26 and 27 are attached. The bar 32 which is fixed to the members 28 and 29 engages with the members 22 and 23 and through them the intermittent checking scraper 21 is also raised and thus a V-shaped connection 57, as shown in Figure 4, is made between the furrows. As the disk 41 rotates, the projection 31 drops off roller 43 and the scrapers and intermittent checking scraper dig into the ground, as shown in Figure 5, and a V-shaped check 59 is constructed across the furrows. The intermittent checking scraper digs another connection 56 between the furrows and then flange 44 of disk 41 engages projection 25 and the intermittent checking scraper is raised out of the ground. The pawl 45 engages in groove 47 and is rotated thus releasing ratchet wheel 40 from the disk 41. The projection 25 rests on flange 44 and the intermittent checking scraper is again held in an inactive position, as shown in Figure 1. The weight of the members 22 and 23 and the intermittent checking scraper 21 is sufficient to prevent the disk 41 from rotating. When it is desired to move the machine from one place to another, the lever 50 is rotated forward thus raising the plows 15 and 16 and scrapers 26 and 27 out of the ground.

Claims:

1. In a furrow making and check building machine of the class described, a carriage including an axle, a plurality of scrapers and intermittent checking scrapers carried by the carriage, a rotatable element loosely mounted on the axle, means for connecting the rotatable element to operate it, means in conjunction with the rotatable element for operating said scrapers to dig connections and build checks, and means in conjunction with said rotatable element to retain the intermittent checking scraper in a raised position when the furrows are being formed.

2. In a furrow making and check building machine of the class described, a carriage including an axle, a plurality of scrapers and an intermittent checking scraper carried by the carriage, a rotatable element loosely mounted on the axle, a rotatable element fixed to the shaft, means associated with said element and operable at will for connecting the rotatable element loosely mounted on the axle to the latter, means in conjunction with said loosely mounted rotatable element for operating said scrapers to dig connections and build checks, and means in conjunction with said loosely mounted rotatable element to retain the intermittent checking scraper in a raised position while the furrows are being formed.

3. A furrow making and check building machine comprising a frame carried by an axle supported on wheels, a plurality of plows connected to the frame, a shaft mounted on the frame, a plurality of scrapers and an intermittent checking scraper connected to the shaft, a disk provided with a flange and roller pin loosely mounted on the axle and a ratchet wheel fixed to the axle, a spring controlled pawl pivoted to the disk, a lever for normally holding the pawl out of engagement with the ratchet wheel, means for releasing the pawl to connect the ratchet wheel and disk to operate the scrapers and intermittent checking scraper and a lever connected to the scrapers and plows to raise them to an inactive position.

4. A furrow making and check building machine comprising a frame supported on an axle carried by wheels, a plurality of plows connected to the frame and a shaft mounted thereon, an intermittent checking scraper frame carrying a checking scraper and having a projection integral therewith, connected to said shaft, a scraper frame, carrying a plurality of scrapers and having a projection integral therewith, connected to said shaft, a bar fixed to the scraper frame to raise the intermittent checking scraper frame when the scrapers are raised, a disk loosely mounted on the axle and a ratchet wheel fixed thereto, a spring controlled pawl for connecting the ratchet wheel and disk, means for holding the pawl out of engagement with the ratchet wheel, and means for releasing the pawl to connect ratchet wheel and disk, a flange integral with the disk to engage the intermittent checking scraper frame projection to raise the checking scraper and hold it in an inactive position, a roller pin fastened to the disk to engage the scraper frame projection and raise the scrapers and intermittent checking scraper, and a lever connected to the plows and scrapers to raise them to an inactive position.

ROBERT H. TRAPNELL.